US009541956B2

(12) United States Patent
Chen et al.

(10) Patent No.: US 9,541,956 B2
(45) Date of Patent: Jan. 10, 2017

(54) SUPPORTING STRUCTURE AND DOCKING STATION USING THE SAME

(71) Applicants: UNIVERSAL SCIENTIFIC INDUSTRIAL (SHANGHAI) CO., LTD., Shanghai (CN); UNIVERSAL GLOBAL SCIENTIFIC INDUSTRIAL CO., LTD., Nantou County (TW)

(72) Inventors: Ming-Jen Chen, Yunlin County (TW); Kuo-Kuang Liu, Nantou County (TW); Yu-Chen Chu, Taichung (TW); Chang-Cheng Lin, Taichung (TW)

(73) Assignees: UNIVERSAL SCIENTIFIC INDUSTRIAL (SHANGHAI) CO., LTD., Shanghai (CN); UNIVERSAL GLOBAL SCIENTIFIC INDUSTRIAL CO., LTD., Nantou County (TW)

( * ) Notice: Subject to any disclaimer, the term of this patent is extended or adjusted under 35 U.S.C. 154(b) by 29 days.

(21) Appl. No.: 14/539,003

(22) Filed: Nov. 12, 2014

(65) Prior Publication Data
US 2015/0346772 A1 Dec. 3, 2015

(30) Foreign Application Priority Data

May 30, 2014 (TW) .............................. 103119002 A (51) Int. Cl.
*F16M 13/00* (2006.01)
*G06F 1/16* (2006.01)
(Continued)

(52) U.S. Cl.
CPC ........... *G06F 1/1632* (2013.01); *F16F 15/022* (2013.01); *F16M 11/10* (2013.01); *F16M 13/00* (2013.01)

(58) Field of Classification Search
CPC ........ G06F 1/1632; G06F 1/16; G06F 1/1613; F16M 11/041
(Continued)

(56) References Cited

U.S. PATENT DOCUMENTS 6,043,976 A * 3/2000 Su .......................... G06F 1/1632
361/679.41
7,038,908 B2 5/2006 Usui et al.
(Continued)

FOREIGN PATENT DOCUMENTS

JP 2004227166 A 8/2004
JP 2007172513 A 7/2007
(Continued)

*Primary Examiner* — Christopher E Garft
(74) *Attorney, Agent, or Firm* — Li & Cai Intellectual Property (USA) Office (57) ABSTRACT

A supporting structure and a docking station using the same are provided. The supporting structure includes an elastic member, a sliding member, a lifting element and a damper. The sliding member having an inclined plane is connected to the elastic member. When the elastic member receives a force, the elastic member forces the sliding member to move along an axis line with the inclined plane facing to the lifting element. The lifting element is arranged over a travel path of the inclined plane and has an abutting portion. When the lifting element receives another force so that the abutting portion abuts against the inclined plane, the sliding member stops moving and the height position of the lifting element is fixed. The damper is mated with the sliding member to slow down the velocity of the sliding member.

18 Claims, 8 Drawing Sheets

US 9,541,956 B2
Page 2

(51) Int. Cl.
*F16M 11/10* (2006.01)
*F16F 15/02* (2006.01)

(58) Field of Classification Search
USPC .................. 248/562; 361/679.41, 679.43
See application file for complete search history.

(56) References Cited

U.S. PATENT DOCUMENTS

| | | | | |
|---|---|---|---|---|
| 7,079,385 B1 * | 7/2006 | Cheng | ................... | G06F 1/1632 248/553 |
| 7,286,344 B2 * | 10/2007 | Kim | ................... | G06F 1/1632 248/552 |
| 7,532,466 B2 | 5/2009 | Kobayashi et al. | | |
| 7,633,750 B2 | 12/2009 | Fan et al. | | |
| 8,644,018 B2 | 2/2014 | Hung | | |
| 2003/0147209 A1 * | 8/2003 | Oross | ................... | G06F 1/1632 361/679.4 |
| 2003/0231464 A1 * | 12/2003 | Weng | ................... | G06F 1/1632 361/679.41 |
| 2004/0012922 A1 * | 1/2004 | Kamphuis | ............. | G06F 1/1632 361/679.02 |
| 2004/0145864 A1 * | 7/2004 | Usui | ................... | G06F 1/1632 361/679.41 |
| 2004/0223293 A1 * | 11/2004 | Nakano | ................. | G06F 1/1632 361/679.43 |
| 2005/0248917 A1 * | 11/2005 | Hiroyoshi | ............. | G06F 1/1632 361/679.41 |
| 2006/0139875 A1 * | 6/2006 | Cheng | ................... | G06F 1/1632 361/679.57 |
| 2007/0297130 A1 * | 12/2007 | Fan | ....................... | G06F 1/1632 361/679.44 |
| 2008/0055844 A1 * | 3/2008 | Kobayashi | ............ | G06F 1/1632 361/679.43 |
| 2008/0100995 A1 * | 5/2008 | Ryder | ................... | G06F 1/1632 361/601 |
| 2008/0189463 A1 * | 8/2008 | Lee | ....................... | G06F 1/1632 710/304 |
| 2008/0239658 A1 * | 10/2008 | Chou | ................... | G06F 1/1632 361/679.38 |
| 2010/0067190 A1 * | 3/2010 | Yu | ......................... | G06F 1/1632 361/679.41 |
| 2010/0265652 A1 * | 10/2010 | Agata | ................... | G06F 1/1632 361/679.41 |
| 2011/0273838 A1 * | 11/2011 | Lin | ....................... | G06F 1/1632 361/679.41 |
| 2012/0001048 A1 * | 1/2012 | Takahashi | ............... | H04M 1/04 248/346.03 |
| 2012/0025051 A1 * | 2/2012 | Nishiyama | ........... | G06F 1/1632 248/346.03 |
| 2012/0127651 A1 * | 5/2012 | Kwon | ................... | G06F 21/88 361/679.43 |
| 2012/0212900 A1 * | 8/2012 | Hung | ................... | G06F 1/1632 361/679.41 |
| 2013/0335915 A1 * | 12/2013 | Lai | ......................... | H01R 13/44 361/679.44 |
| 2014/0153162 A1 * | 6/2014 | Kim | ..................... | G06F 1/1616 361/679.01 |
| 2014/0376173 A1 * | 12/2014 | Yaojun | ................. | G06F 1/1632 361/679.43 |
| 2015/0029657 A1 * | 1/2015 | Chang | ................... | G06F 1/1632 361/679.44 |
| 2015/0346772 A1 * | 12/2015 | Chen | .................... | G06F 1/1632 248/562 |

FOREIGN PATENT DOCUMENTS

| | | |
|---|---|---|
| JP | 2008004100 A | 1/2008 |
| TW | 200928666 A | 7/2009 |
| TW | 201019073 A | 5/2010 |
| TW | 201303555 A1 | 1/2013 |
| TW | I414929 B | 11/2013 |
| WO | WO 2006117858 A1 | 11/2006 |

* cited by examiner

SUPPORTING STRUCTURE AND DOCKING STATION USING THE SAME

BACKGROUND OF THE INVENTION

1. Field of the Invention

The present invention relates to a supporting structure and a docking station using the same; in particular, to a supporting structure and a docking station using the same adapted for a portable electronic device.

2. Description of Related Art

The laptop is usually required to have light weight, a small size and thin wall for easy carry-on convenience so that a user can use the laptop in different situations. However, compared to desktop computer, the number of the function expansion slots, such as USB, VGA, HDMI and so on, and the expandability of the laptop are limited by the smaller size. In addition, when the user wants to use the peripheral equipment through the laptop, the connections between the peripheral equipment and the laptop must be established. The aforementioned peripheral equipment could be a displaying screen, a mouse, a keyboard, a printer an external hard drive, a network interface card, a scanner and so on. However, when the user wants to put away the laptop, all of the connections of the peripheral equipment need to be pulled out from the laptop.

To omit the acts of inserting or pulling the connecting plugs of these peripheral equipment into or out from the laptop, the connections between the peripheral equipment and the laptop can be established through an expansion base. The expansion base can make and keep available connections to the peripheral equipment. Additionally, the expansion base can determine whether the laptop is electrically connected to the expansion base so as to operate the peripheral equipment. Thus, when the laptop is connected to the expansion base, the user can operate the peripheral equipment by controlling the laptop. When the user wants to take the laptop away, the user simply interrupts the connection between the expansion base and the laptop so that the connection between the peripheral equipment and the laptop can be immediately stopped.

Figure 1:
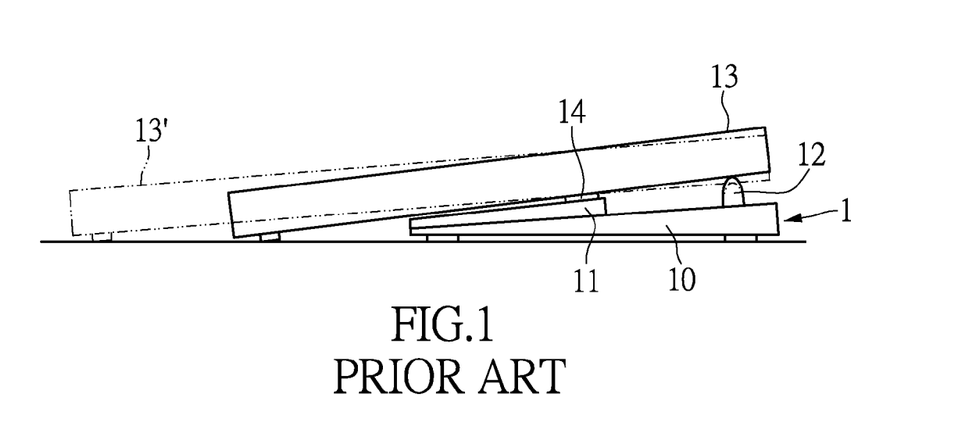
FIG. 1 shows a side view of portable electronic device placed on a conventional expansion base.

Please refer to FIG. 1. FIG. 1 illustrates a side view of portable electronic device placed on the conventional expansion base. For example, the two portable electronic devices 13 and 13' are laptops, respectively. In addition, the conventional expansion base 1 includes a base 10, a plate 11 and at least one supporting pillar 12. The plate 11 and the supporting pillar 12 are disposed on the base 10. When the portable electronic device 13 or 13' is placed on the conventional expansion base 1, a connecting port (not shown in FIG. 1) of the portable electronic device 13 or 13' connects a connector 14 of the conventional expansion base 1 to establish an electrical connection. Meanwhile, the bottom surface of the portable electronic device 13 or 13' abuts the plate 11 and the supporting pillar 12.

However, because the height of the supporting pillar 12 protruded from the base 10 cannot be adjusted, the conventional expansion base 1 is only suitable for the portable electronic device 13 having specific thickness or special shape. When another portable electronic device 13' having larger size in shape is placed on the conventional expansion base 1, it is likely that the portable electronic device 13' having larger size in shape may not be connected to the connecter 14 of the conventional expansion device 1 since the height of the supporting pillar 12 protruded from the base 10 is fixed. As such, the electrical connection between the portable electronic device 13' having larger size in shape and the conventional expansion base 1 may not be made well.

SUMMARY OF THE INVENTION

The object of the present invention is to provide a supporting structure and a docking station using the same, in which the height of a lifting element is associated with what position of the inclined plane of a sliding member the lifting member abuts against. In addition, a damper and an elastic member are used to slow down the sliding movement of the inclined plane of the sliding member and to postpone the timing at which the lifting element is interposed and fixed between the portable electronic device and the sliding member.

In order to achieve the aforementioned objects, according to an embodiment of the present invention, a supporting structure is provided. The supporting structure includes an elastic member, a sliding member, a lifting element and a damper. The sliding member having an inclined plane is connected to the elastic member. When receiving a force, the elastic member forces the sliding member to move along a first axis line. The lifting element having an abutting portion is arranged over a travel path of the inclined plane. When the sliding member moves along the first axis line, the inclined plane faces toward the lifting element. When the abutting portion of the lifting element abuts against the inclined plane, the sliding member stops moving and the height position of the lifting element is fixed. The damper is mated with the sliding member to slow down the velocity of the sliding member.

According to another embodiment of the present invention, a docking station is provided. The docking station includes a housing, a floating cover, at least one trigger and at least one supporting structure. The floating cover, which has a bottom surface, is movably disposed on the housing and partially covers a surface of the housing. The trigger is disposed on the bottom surface of the floating cover. The supporting structure includes an elastic member, a sliding member, a lifting element and a damper. The sliding member having an inclined plane is connected to the elastic member. When the trigger activates the action of the supporting structure, the elastic member receives a force and forces the sliding member to move along a first axis line. The lifting element is arranged over a travel path of the inclined plane and has an abutting portion. When the sliding member moves, the inclined plane faces toward the lifting element. When the abutting portion of the lifting element abuts against the inclined plane, the sliding member stops moving and the height position of the lifting element is fixed. The damper is mated with the sliding member to slow down the velocity of the sliding member so that the timing of fixing the height position of the lifting element can be postponed.

In one embodiment of the present invention, the damper and the elastic member are applied in the supporting structure of the docking station to slow down the sliding movement of the sliding member. As such, the timing of fixing the height position of the lifting element can be postponed. Thus, the lifting element is not fixed until the height position of the lifting element of the supporting structure is adjusted to a suitable position for supporting the portable electronic device according to the thickness or the size of the portable electronic device thereof. Accordingly, the docking station of an embodiment of the present invention can be adapted for portable electronic devices of different sizes and thickness.

In order to further the understanding regarding the present invention, the following embodiments are provided along with illustrations to facilitate the disclosure of the present invention.

DETAILED DESCRIPTION OF THE PREFERRED EMBODIMENTS

The aforementioned illustrations and following detailed descriptions are exemplary for the purpose of further explaining the scope of the present invention. Other objectives and advantages related to the present invention will be illustrated in the subsequent descriptions and appended drawings.

Figure 2:
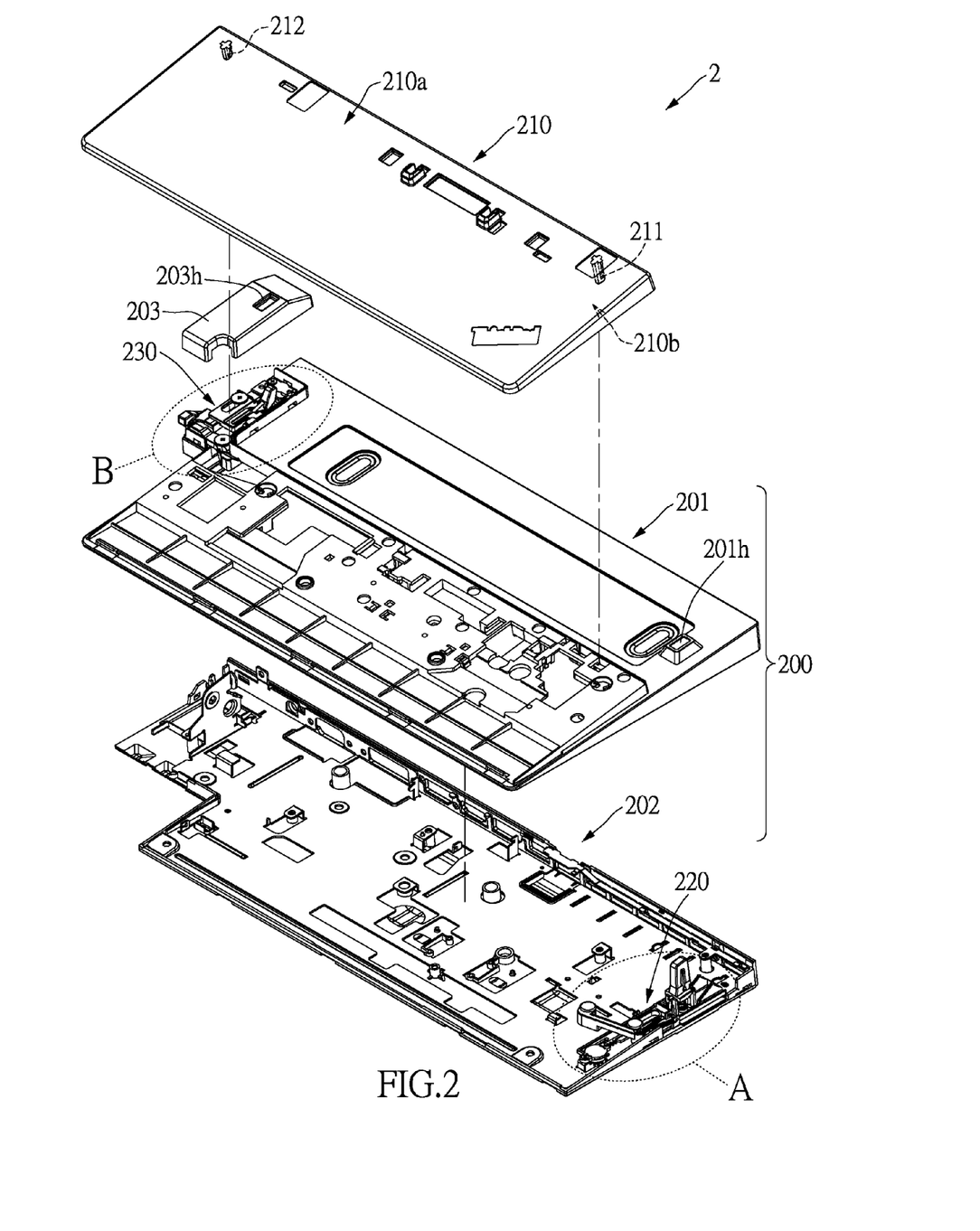
FIG. 2 shows a perspective exploded view of a supporting structure implemented in a docking station according to an embodiment of the present invention.

Please refer to FIG. 2 showing a perspective exploded view of a docking station according to an embodiment of the present invention. The docking station 2 includes a housing 200, a floating cover 210 and at least one supporting structure. FIG. 2 shows two supporting structures, which are respectively a first supporting structure 220 and a second supporting structure 230. Notably, the docking station 2 is taken as an example in the instant embodiment for detailed descriptions of the supporting structure of the present invention. However, the supporting structure also may be implemented in another device for supporting another article, and not be limited to be used in the docking station.

The housing 200 includes an upper cover 201 and a bottom plate 202, and an accommodating space is defined by the upper cover 201 and the bottom plate 202 for accommodating at least one electrical module, such as printed circuit board (PCB) assembly (not shown in FIG. 2). A connector (not shown in FIG. 2) is disposed on the PCB assembly for establishing an electrical connection with the portable electronic device. The portable electronic device may be such as a laptop, a tablet computer, a personal digital assistant (PDA) or a smartphone. In one embodiment, the connector passes through a slot formed on the upper plate 201 and another corresponding slot formed on the floating cover 210, and is capable of protruding from the floating cover 210 to make an electrical connection with the portable electronic device.

The floating cover 210, which has a supporting surface 210a and a bottom surface 210b, is movably disposed on the housing 200. In one embodiment, one side of the floating cover 210 is pivotally connected to a side of the housing 200. Additionally, the bottom surface 210b of the floating cover 210 is connected to the housing 200 by disposing a resilient member therebetween so that the floating cover 210 can be supported on the housing 200. The floating cover 210 includes at least one trigger. Take the floating cover 210 shown in FIG. 2 as an example, the floating cover 210 includes a first trigger 211 and a second trigger 212. The first trigger 211 and the second trigger 212 are respectively used to activate the actions of the first supporting structure 220 and the second supporting structure 230. In the instant embodiment, both of the first trigger 211 and the second trigger 212 are posts protruding from the bottom surface 210b of the floating cover 210. The actions of the first supporting structure 220 activated by the first trigger 211 and the actions of the second supporting structure 230 activated by the second trigger 212 will be described in detail below.

In one embodiment, the first supporting structure 220 and the second supporting structure 230 are arranged in the accommodating space of the housing 200 for supporting the portable electronic device. In the instant embodiment of the present invention, the first supporting structure 220 is disposed on the bottom plate 202, and the second supporting structure 230 is disposed on the upper cover 201.

Figure 3A:
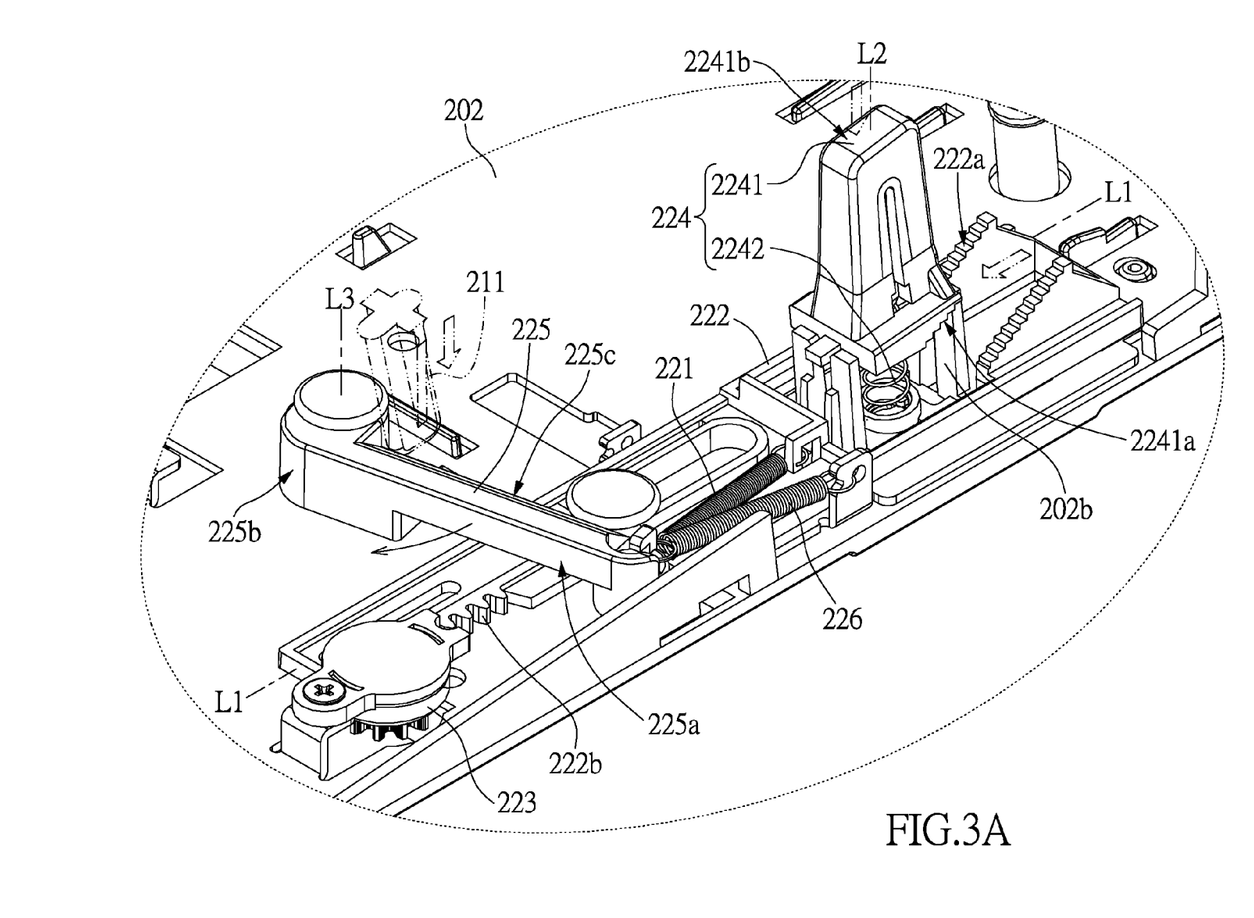
FIG. 3A shows an enlarged view of a first supporting structure according to an embodiment of the present invention.
Figure 3B:
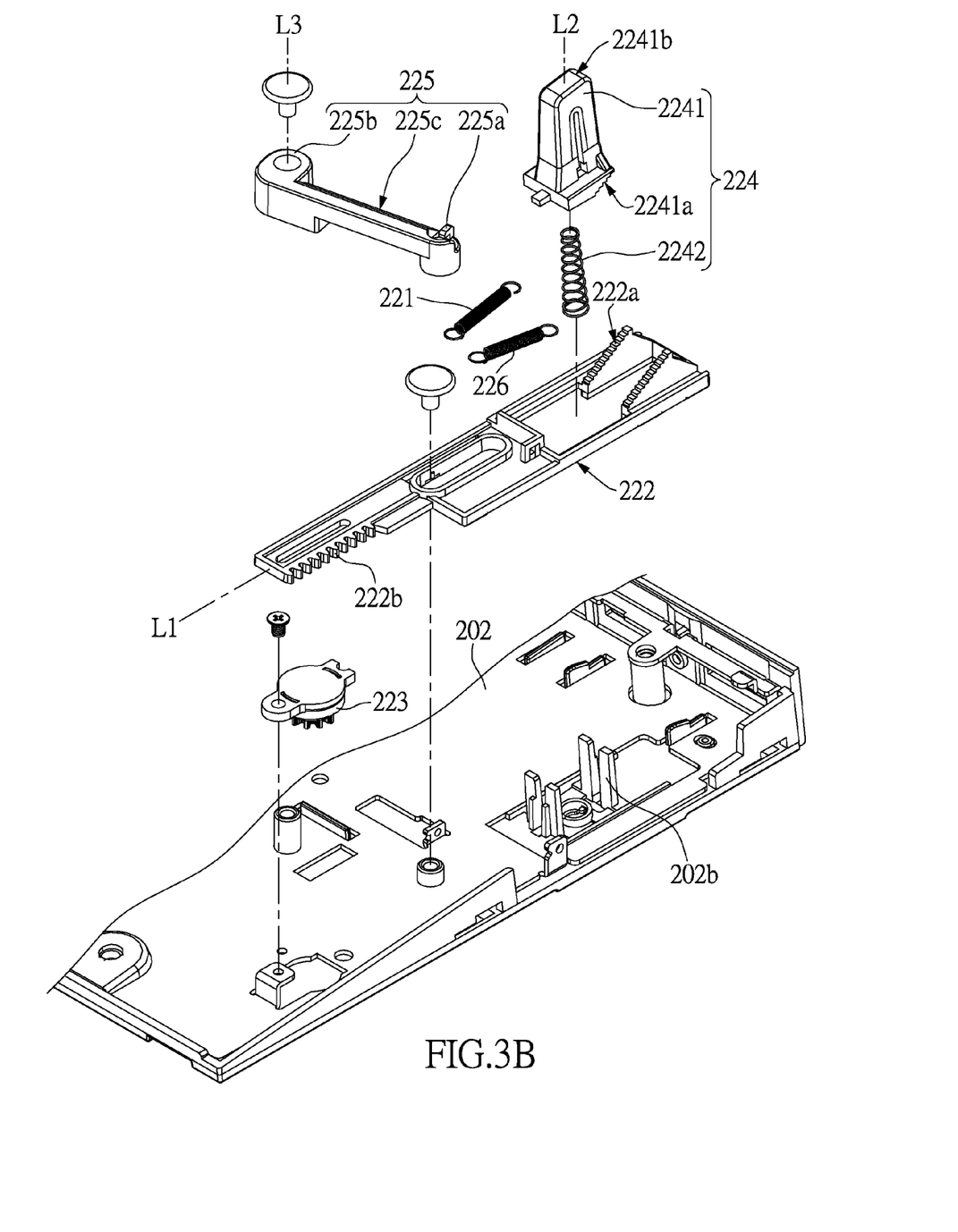
FIG. 3B shows a perspective exploded view of the first supporting structure according to an embodiment of the present invention.

Please refer to FIG. 3A and FIG. 3B. FIG. 3A illustrates an enlarged view of the first supporting structure according to an embodiment of the present invention. FIG. 3B shows a perspective exploded view of the first supporting structure according to an embodiment of the present invention. The first supporting structure 220 includes an elastic member 221, a sliding member 222, a damper 223, a lifting element 224, a swing element 225 and a return element 226. One end of the elastic member 221 is connected to the sliding member 222. When receiving a force, the elastic member 221 applies an elastic force to the sliding member 222. In one embodiment, the elastic member 221 may be an extension spring or a compression spring.

The sliding member 222 has an inclined plane 222a. In an embodiment of the present invention, the inclined plane 222a may be a stair-shaped surface or a rough surface. When the sliding member 222 receives the elastic force coming from the elastic element 221, the sliding member 222 moves along a first axis line L1. In one embodiment, the sliding member 222 is disposed on the bottom plate 202, and a restricting structure (not shown in FIGS. 3A and 3B) is disposed on the bottom plate 202 to restrict the sliding member 222 to move forth and back along the first axis line L1. The restricting structure is such as a groove, a protruding rib, a protruding pillar, a pin, a bolt or any of the combinations thereof. Furthermore, in the instant embodiment, the sliding member 222 has a limiting groove for mating with the restricting structure of the bottom plate 202 to limit the travelling distance of the sliding member 222.

The damper 223 is mated with the sliding member 222 to slow down the velocity of the sliding member 222. Specifically, when the sliding member 222 is driven due to the elastic force from the elastic member 221, the damper 223 provides a resistance force to slow down the movement of the sliding member 222. In an embodiment, the damper 223 may be a gear damper, and the sliding member 222 may have a rack 222b, which is engaged with the gear damper. When the sliding member 222 starts moving, the movement of the rack 222b drives the rotation of a gear of the gear damper. When the gear of the gear damper rotates, the resistance force is generated by the gear damper to decrease the velocity of the sliding member 222.

In the instant embodiment, the lifting element 224 is arranged over a travel path of the inclined plane 222a. The lifting element 224 is capable of moving up and down along a second axis line L2, which is not parallel to the first axis line. In the instant embodiment, the second axis line L2 is substantially perpendicular to the first axis line L1.

The lifting element 224 of the instant embodiment includes an abutting member 2241 and an elastic component 2242. The abutting member 2241 is adapted to abut to the portable electronic device and movably disposed on the bottom plate 202 by the elastic component 2242. In other words, one end of the elastic component 2242 is connected to a bottom of the abutting member 2241, and the other end of the elastic component 2242 is connected to the bottom plate 202. In addition, a lower abutting portion 2241a is disposed on the bottom of the abutting member 2241 and associated with the inclined plane 222a. For example, when the inclined plane 222a is a stair-shaped structure, the lower abutting portion 2241a may have a stair structure facing to the inclined plane 222a for mating with the stair-shaped structure.

In the instant embodiment, the bottom plate 202 may include a guiding structure 202b, such as a pair of rails or posts protruded from the surface of the bottom plate 202. When an external force is applied to a top abutting portion 2241b of the abutting member 2241, the abutting member 2241 can be guided by the guiding structure 202b to move down along the second axis line L2. For example, the external force applied to the top abutting portion 2241b may be contributed to by the weight of the portable electronic device. In addition, when the external force applied to the top abutting portion 2241b of the abutting member 2241 is removed, the abutting member 2241 may move back to the original height position along the second axis line L2 by a resilience force of the elastic component 2242 and the restriction of the guiding structure 202b. Please refer to FIG. 2, the upper cover 201 of the instant embodiment shields the first supporting structure 220 and has a first opening 201h formed thereon for mating with the abutting member 2241. The top abutting portion 2241b of the abutting member 2241 may extend out of the housing 200 through the first opening 201h and protrudes from an outer surface of the upper cover 201.

In an embodiment of the present invention, the swing element 225 is connected to the sliding member 222 through the elastic member 221. When the swing element 225 is pulled, a pull force is generated by the elastic member 221 to drive the sliding member 222 to move. In one embodiment, the swing element 225 may be a lever and have a first end portion 225a and a second end portion 225b. The first end portion 225a is connected to the elastic member 221. Furthermore, the swing element 225 has a pivot point so that the first end portion 225a can be rotated relative to the pivot point. In one embodiment of the present invention, the pivot point of the swing element 225 is located at the second end portion 225b. Specifically, the second end portion 225b of the swing element 225 may be disposed on the bottom plate 202 by using a pivot shaft so that the first end portion 225a can rotate relative to a third axis line L3, which passes through the center of the pivot shaft. In one embodiment, the third axis line L3 is not parallel to the first axis line L1. When the first end portion 225a rotates relative to the third axis line L3, the swing element 225 drives the following actions to bring the sliding member 222 move along the first axis line L1.

The swing element 225 is adapted to mate with the aforementioned first trigger 211. In the instant embodiment, the first trigger 211 may be a post protruding from the bottom surface 210b of the floating cover 210, and the swing element 225 has a slant 225c formed between the first end portion 225a and the second end portion 225b. When the floating cover 210 supports the weight of the portable electronic device and then being pressed into a down state, the first trigger 211 can slid down along the slant 225c and force the swing element 225 to rotate in a predetermined direction, for instance in a clockwise direction, so as to drive the motion of the sliding member 222

The return element 226 may be a spring, for instance an extension spring, a compression spring or a torsion spring. In the instant embodiment, the return element 226 is the extension spring, one end of which is connected to the housing 200 or the bottom plate 202, and the other end is connected to the swing element 225. When the swing element 225 moves back to an initial position through the return element 226, the swing element 225 drives the sliding member 222, which has moved due to the elastic force, to return to the original position. Specifically, when the connection between the portable electronic device and the docking station 2 is resolved, and the portable electronic device is taken off from the docking station 2, the floating cover 210 can be restored to an original state by the resilient member. Accordingly, the first trigger 211 does not restrict the swing element 225 any more so that the swing element 225 can be returned to its initial state by a resilience of the return element 226 and bring the sliding member 222 back to the original position.

In one embodiment, the return element 226 may be a torsion spring, which is disposed on the pivot point of the swing element 225. In another embodiment, the elastic member 221 can also serve the function of the return element 226.

Figure 4A:
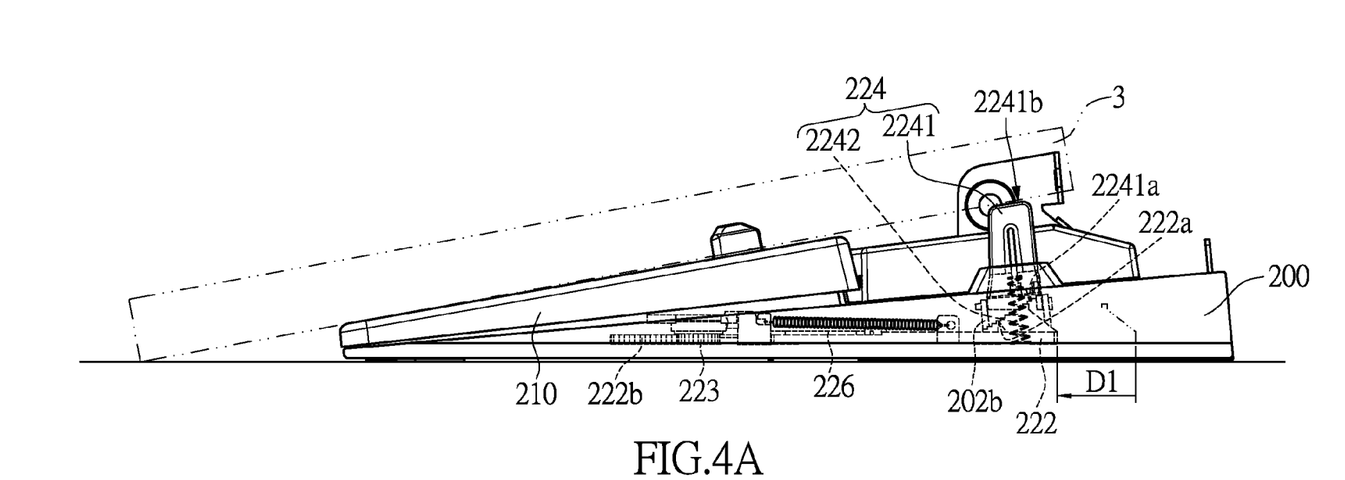
FIG. 4A shows a schematic diagram of the first supporting structure when a portable electronic device having thinner thickness is placed on the docking station according to an embodiment of the present invention.
Figure 4B:
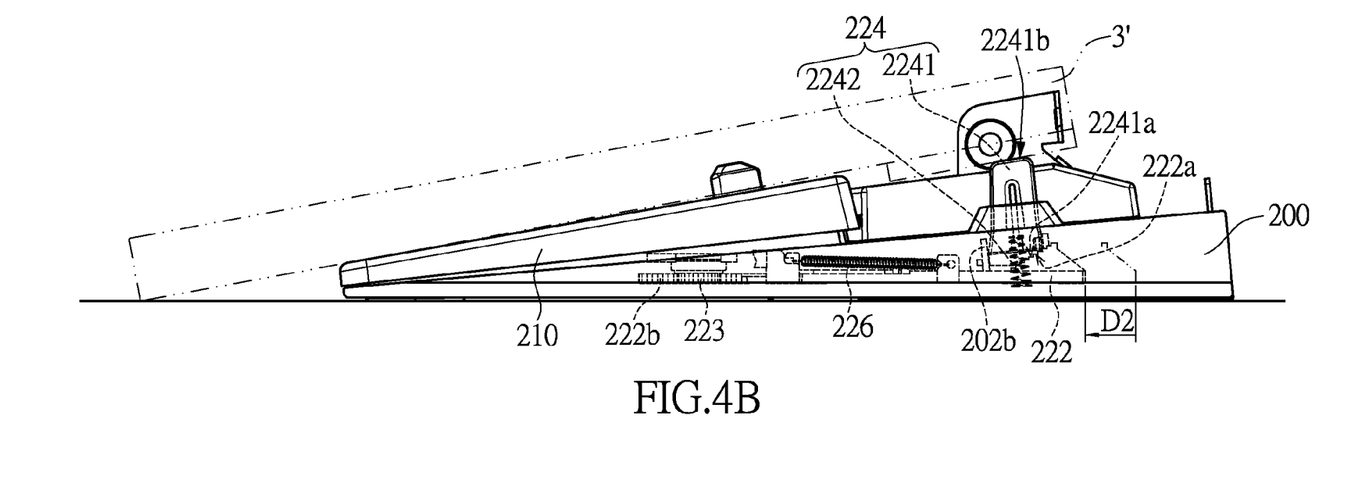
FIG. 4B shows a schematic diagram of the first supporting structure when a portable electronic device having thicker thickness is placed on the docking station according to an embodiment of the present invention.

Please refer to FIG. 4A and FIG. 4B, which respectively illustrate the different schematic diagrams of the first supporting structure when each of the portable electronic devices having different thicknesses is placed on the docking station according to an embodiment of the present invention. When the portable electronic device 3 or 3' is placed on the docking station 2, the floating cover 210 is pressed into the down state due to the weight of the portable electronic device 3 or 3'. Meanwhile, the first trigger 211 protruding from the bottom surface 210b of the floating cover 210 pulls the swing element 225 to stretch the elastic member 221 and drive the motion of the sliding member 222. Furthermore, the weight of the portable electronic device 3 or 3' applies the external force to the lifting element 224 so that the lifting element 224 moves down. That is, the portable electronic device 3 or 3' presses the top abutting portion 2241b of the abutting member 2241 and forces the lifting element 224 to descend.

The descent of the lifting element 224 due to the weight of the portable electronic device 3 or 3' is in step with the movement of the sliding member 222 with the inclined plane 222a facing toward the lifting element 224. However, because the damper 223 can decrease the velocity of the sliding member 222, the movement velocity of the sliding member 222 is slower than the descending velocity of the lifting element 224. As such, the timing at which the inclined plane 222a of the sliding member 222 abuts the lifting element 224 can be postponed after the sliding member 222 starts to move from the original position to the position under the lifting element 224. Accordingly, after the lifting element 224 is pressed down to a suitable height position according to the thickness of the portable electronic device, the sliding member 222 moves to the position under the lifting element 224 to support and fix the lifting element 224. Meanwhile, the inclined plane 222a of the sliding member 222 and the lower abutting portion 2241a of the lifting element 224 abut each other so that the movement of the sliding member 222 is stopped.

Specifically, when the sliding member 222 moves to the position under the lifting element 224 with the inclined plane 222a facing to the lifting element 224, the lower abutting portion 2241a of the lifting element 224 presses the inclined plane 222a so that the movement of the sliding member 222 is stopped. When the portable electronic device 3 has thinner thickness, the descending distance of the lifting element 224 is shorter and the movement distance D1 of the sliding member 222 along the first axis line L1 is longer. As such, the lower abutting portion 2241a abuts a location nearer to the top of the inclined plane 222a, as shown in FIG. 4A. When the portable electronic device 3' has a thicker thickness, the descending distance of the lifting element 224 is longer and the movement distance D2 of the sliding member 222 along the first axis line L1 is shorter. Accordingly, the lower abutting portion 2241a abuts to a location nearer to the bottom of the inclined plane 222a, as shown in FIG. 4B.

Figure 5A:
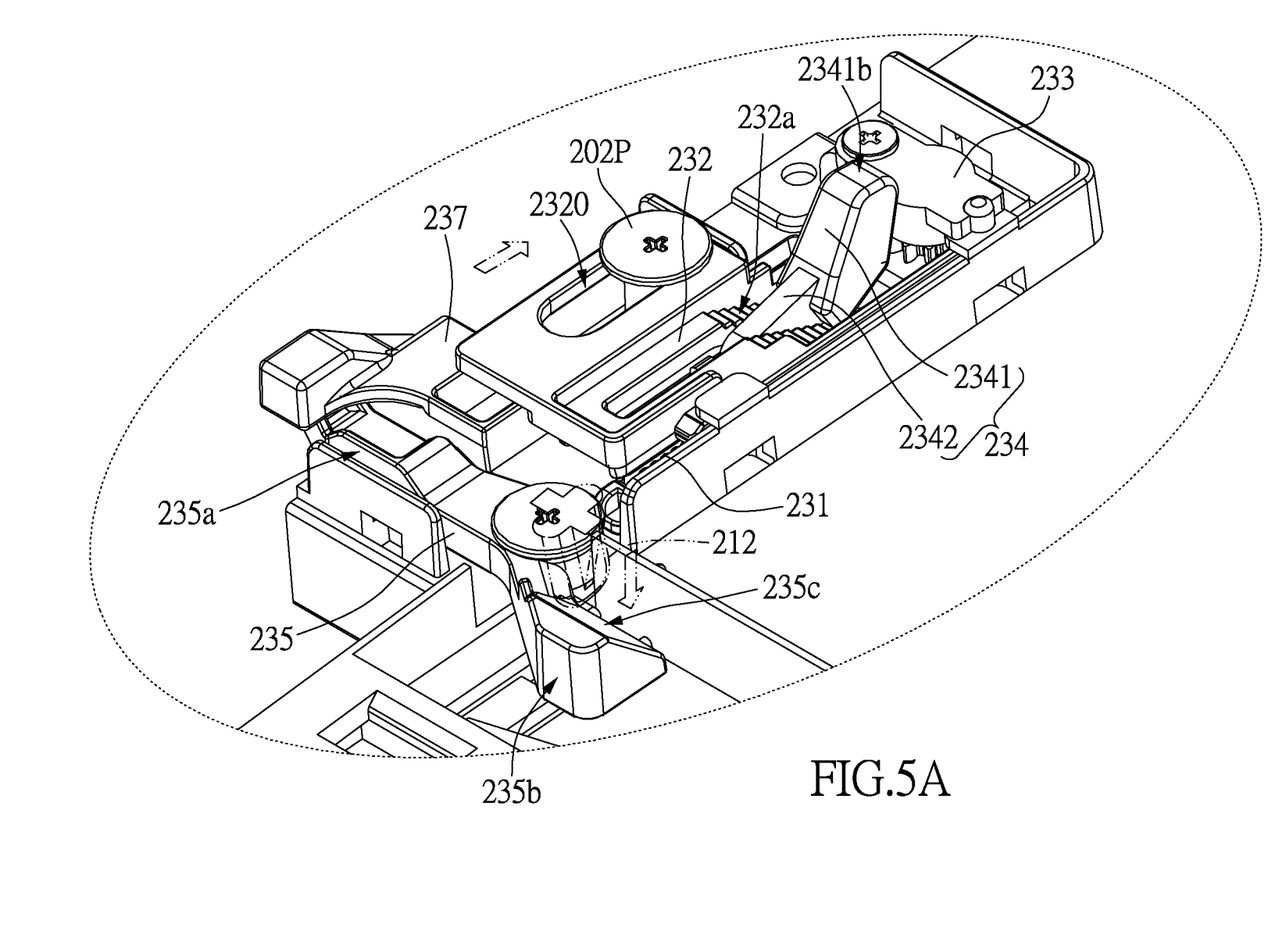
FIG. 5A shows an enlarged view of a second supporting structure according to an embodiment of the present invention.
Figure 5B:
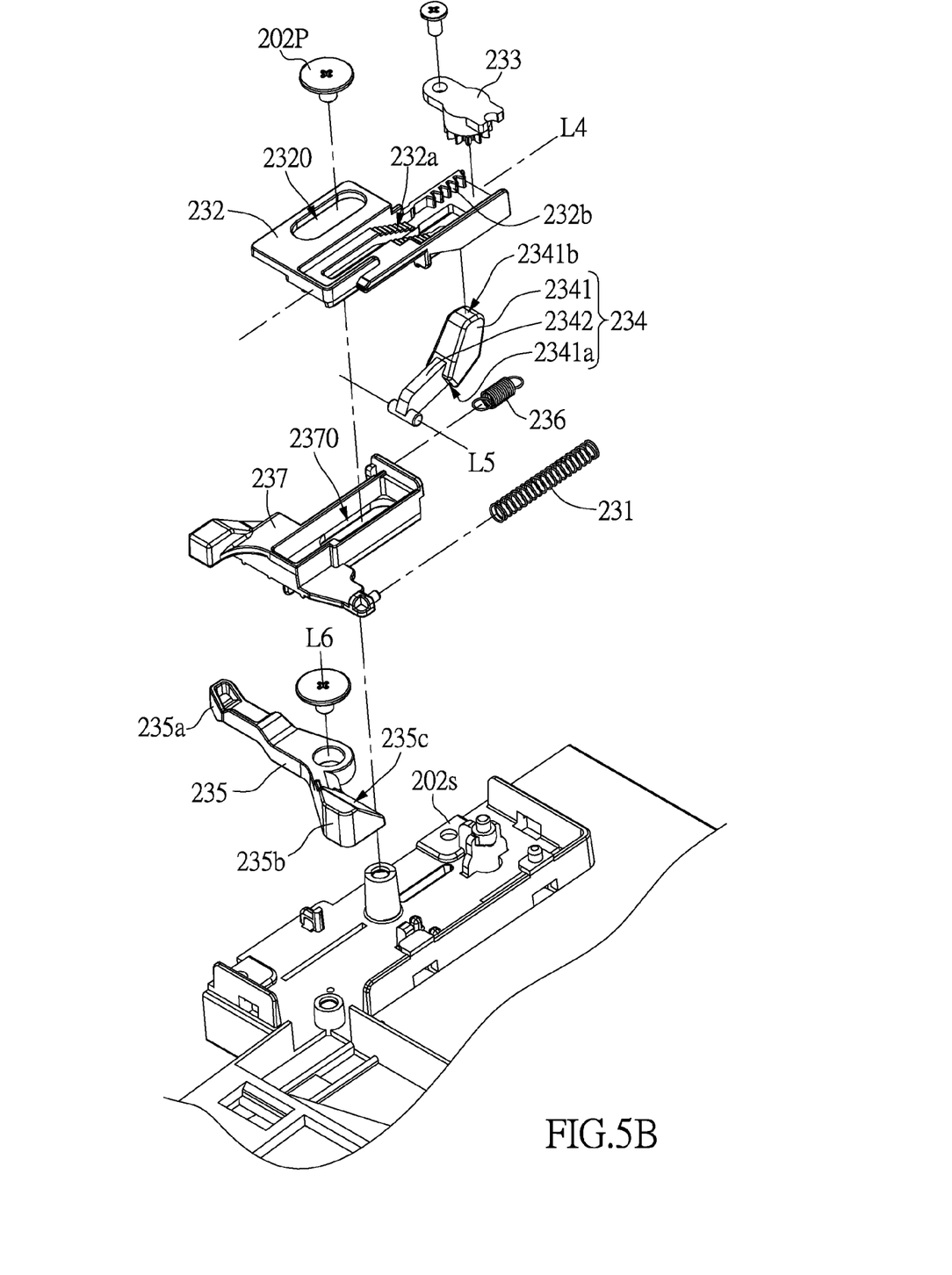
FIG. 5B shows an perspective exploded view of the second supporting structure according to an embodiment of the present invention.

Please refer to FIG. 5A and FIG. 5B. FIG. 5A shows an enlarged view of a second supporting structure according to an embodiment of the present invention. FIG. 5B shows a perspective exploded view of the second supporting structure according to an embodiment of the present invention. The second supporting structure 230 includes an elastic member 231, a sliding member 232, a damper 233, a lifting element 234, a swing element 235, a return element 236 and driven part 237.

In the instant embodiment, one end of the elastic member 231 is connected to the sliding member 232. When receiving a force, the elastic member 231 may apply an elastic force to the sliding member 232. The other end of the elastic member 231 is connected to the driven part 237. Additionally, the elastic member 231 may be an extension spring or a compression spring.

The sliding member 232 of the instant embodiment has an inclined plane 232a, and the inclined plane 232a may be a stair-shaped surface or a rough surface. When the sliding member 232 receives the elastic force coming from the elastic element 231, the sliding member 232 moves along a fourth axis line L4. In the instant embodiment, the fourth axis line L4 is parallel to the first axis line L1.

In one embodiment, the sliding member 232 is disposed on the upper cover 201, and at least one restricting structure (not shown in FIGS. 5A and 5B) is disposed on the upper cover 201 to restrict the movement range of the sliding member 232. The restricting structure is such as a groove, a protruding rib, a protruding pillar, a pin, a bolt or any of the combinations thereof. Additionally, in one embodiment, the sliding member 232 has a restricting groove 2320 so that a pin 202P can pass through the restricting grove 2320 to be disposed on the upper cover 201. Additionally, the shape of the restricting groove 2320 has a long axis which is substantially parallel to the fourth axis line L4. Accordingly, a movement distance of the sliding member 232 may be constrained by the length of the restricting groove 2320 when the sliding member 232 is moving.

The damper 233 is mated with the sliding member 232 to slow down the velocity of the sliding member 232. Specifically, when the sliding member 232 is driven due to the elastic force from the elastic member 231, the damper 233 provides a resistance force to slow down the movement of the sliding member 232. In an embodiment, the damper 233 may be a gear damper, and the sliding member 232 may have a rack 232b, which is engaged with the gear damper. When the sliding member 232 starts moving, the movement of the rack 232b drives the rotation of a gear of the gear damper. When the gear of the gear damper rotates, the resistance force may be generated by the gear damper to decrease the velocity of the sliding member 232.

In the instant embodiment, the lifting member 234 is arranged over a travel path of the inclined plane 232a, and is capable of rotating relative to a fifth axis line L5, which is substantially perpendicular to the fourth axis line L4.

To put it concretely, the lifting element 234 of the instant embodiment includes an ejector block 2341 and a rod 2342. One end of the rod 2342 is pivotally connected to the upper cover 201, and the other end of the rod 2342 is connected to the ejector block 2341. The ejector block 2341 includes a lower abutting portion 2341a and a top abutting portion 2341b, which are respectively located at the bottom and the top of the ejector block 2341. The lower abutting portion 2341a may abut a lower portion of the inclined plane 232a at first. While the sliding member 232 is moving along the fourth axis line L4 with the inclined plane 232a facing to the ejector block 2341, the rod 2342 rotates relative to the fifth axis line L5 so that the elector block 2341 is driven to gradually ascend the inclined plane 232a of the sliding member 232. That is, in the instant embodiment, the lower abutting portion 2341a of the ejector block 2341 initially abuts the lower portion of the inclined plane 232a. When the sliding member 232 starts moving with the inclined plane 232a facing to the ejector block 2341, the lower abutting portion 2341a is gradually lifted from a lower position to a higher position by the movement of the inclined plane 232a.

Additionally, please refer to FIG. 2, the housing 200 of the docking station 2 according to the instant embodiment further includes an outer cover 203 adapted to cover most of the second supporting structure 230. The outer cover 203 has a second opening 203h formed thereon and corresponding to the ejector block 2341 so that a top of the ejector block 2341 is capable of extending out of the outer cover 203 through the second opening 203h.

In an embodiment of the present invention, the swing element 235 abuts the aforementioned driven part 237, and the driven part 237 is elastically connected to the sliding member 232 through the elastic member 231. When the swing element 235 is pushed, the driven part 237 is also pushed by the swing element 235 and then drives the sliding member 232 to move along the fourth axis line L4. In one embodiment, the swing element 235 may be a level, which has a first end portion 235a and a second end portion 235b opposite thereto.

Additionally, the swing element 235 has a pivot point so that the first end portion 235a and the second end portion 235b are capable of rotating relative to the pivot point. In an embodiment of the present invention, the pivot point is located between the first end portion 235a and the second end portion 235b. Specifically, the swing element 235 may be disposed on the upper cover 201 by using a pivot shaft. When the second end portion 235b is triggered and rotates relative to a sixth axis line L6, the first end portion 235a is also driven to rotate relative to the sixth axis line L6. By the rotation of the first end portion 235a relative to the sixth axis line L6, the swing element 235 pushes the driven part 237 with the first end portion 235a to move. In one embodiment, the sixth axis line L6 is substantially perpendicular to both of the fourth and fifth axis line L4, L5.

The swing element 235 is adapted for mating with the aforementioned second trigger 212. In the instant embodiment, the second trigger 212 may be a post protruding from the bottom surface 201b of the floating cover 210, and the swing element 235 has a slant 235c formed on the second end portion 235b. When the floating cover 210 supports the weight of the portable electronic device and then being pressed into the down state, the second trigger 212 may slid down along the slant 235c and force the first end portion 235a to rotate in a predetermined direction, for instance in a clockwise direction, so as to push the driven part 237 to drive the motion of the sliding member 232. In one embodiment, the triggers 235 and 225 can be replaced with each other.

In the instant embodiment, the driven part 237 has a slot 2370 formed thereon and the slot 2370 is in alignment with the restricting groove 2320. That is to say, the pin 202P sequentially passes through the restricting groove 2320 and the slot 2370 to be fastened to the upper cover 201. Furthermore, a stopper portion 202s disposed on the upper cover 201 is used to restrict the movement range of the driven part 237 together with the aforementioned pin 202P.

The return element 236 may be a spring, for instance an extension spring, a compression spring or a torsion spring. In the instant embodiment, the return element 236 is the extension spring, one end of which is connected to the housing 200, and the other end is connected to the driven part 237. The return element 236 is used to drive the sliding member 232 back to the original position. Specifically, when the connection between the portable electronic device and the docking station 2 is resolved, and the portable electronic device is taken off from the docking station 2, the floating cover 210 can be restored to original state by the resilient member. Accordingly, the second trigger 212 does not restrict the swing element 235 any more so that the driven part 237 can be restored to initial state by a resilience of the return element 236, and the elastic element 231 can bring the sliding member 232 back to the original position.

In one embodiment, the return element 236 may be a torsion spring, which is disposed on the pivot point of the swing element 235, and the first end portion 235a of the swing element 235 is pivotally connected to the driven part 237, which can also achieve the same results described in the aforementioned embodiments. In another embodiment, the elastic member 231 also can be used to serve the function of the return element.

Figure 6A:
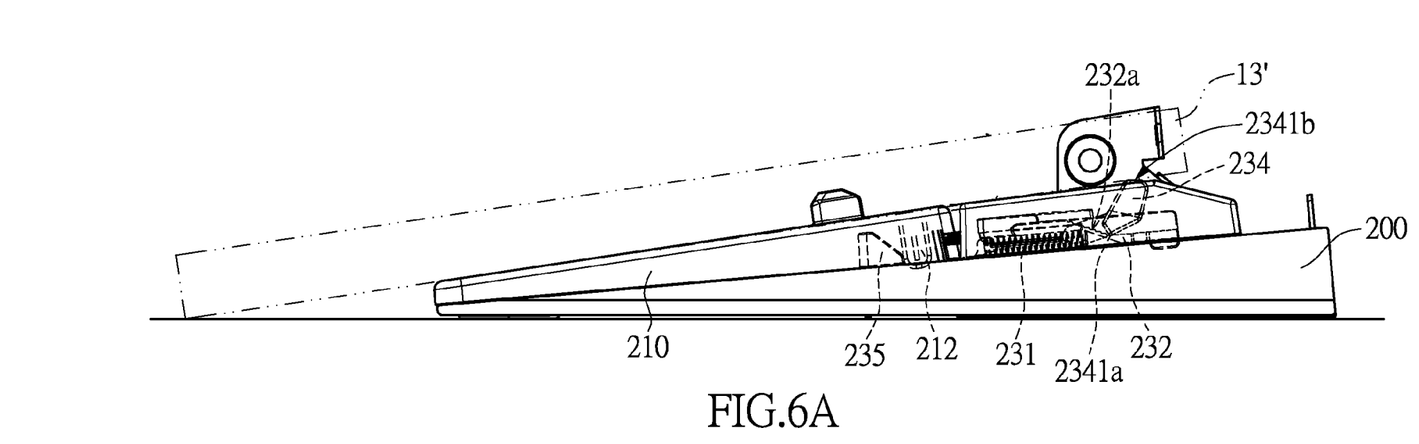
FIG. 6A shows a schematic diagram of the second supporting structure when a portable electronic device having larger size in shape is placed on the docking station according to an embodiment of the present invention.
Figure 6B:
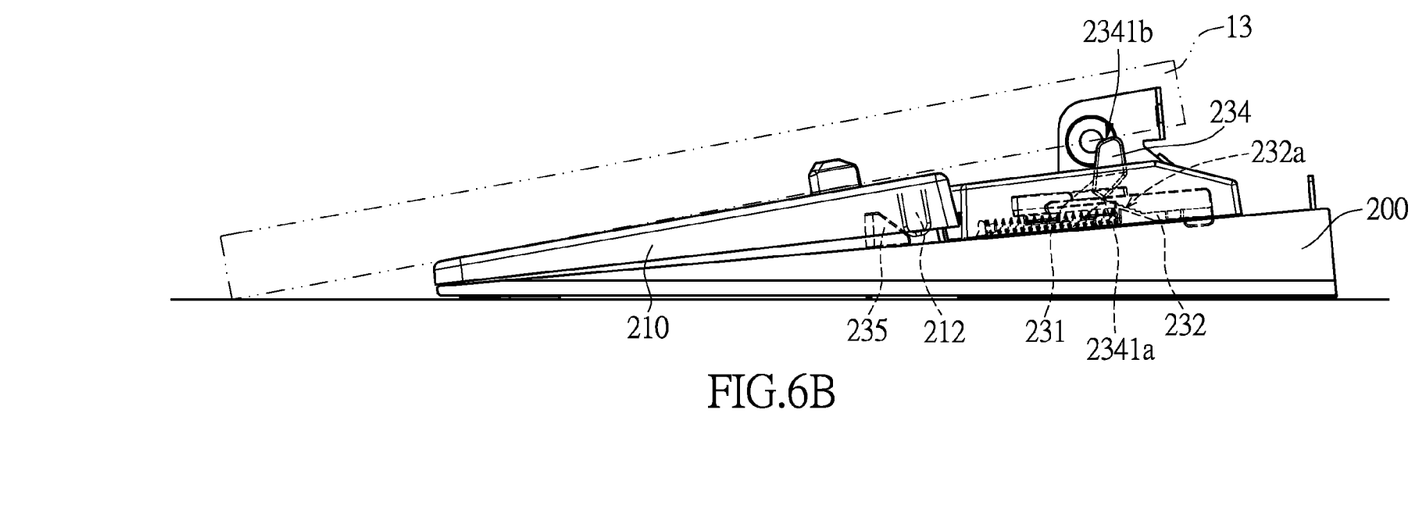
FIG. 6B shows a schematic diagram of the second supporting structure when a portable electronic device having smaller size in shape is placed on the docking station according to an embodiment of the present invention.

Please refer to FIG. 6A and FIG. 6B, which respectively illustrate the different schematic diagrams of the second supporting structure when each of the portable electronic devices having different sizes is placed on the docking station according to an embodiment of the present invention. Specifically, when the portable electronic device 13 or 13' is placed on the docking station 2, the floating cover 210 is pressed into the down state due to the weight of the portable electronic device 13 or 13'. Meanwhile, the second trigger 212, which protrudes from the bottom surface 210b of the floating cover 210, pulls the swing element 235 to push the driven part 237 and drive the motion of the sliding member 232.

When the sliding member 232 is driven to move, the lifting element 234 is gradually lifted by the inclined plane 232a. However, during the movement of the sliding member 232, the velocity of the sliding member 232 is slowed down by the damper 233 so that the ascending time of the lifting element 234 from a lowest point to a highest point is extended. As such, the ascending velocity of the lifting element 234 is slower than the velocity of pressing the portable electronic device 13 or 13' to a suitable position. Accordingly, after the portable electronic device 13 or 13' has been placed on the docking station 2 and arranged in a suitable position, the lifting element 234 is lifted to a suitable height position by the inclined plane 232a and abuts the portable electronic device 13 or 13' with the top abutting portion 2341b to provide support.

When the top abutting portion 2341b of the lifting element 234 and the portable electronic device 13 or 13' abut each other, the lifting element 234 receives the pressure provided by the weight of the portable electronic device 13 or 13' so that the lower abutting portion 2341b presses and abuts the inclined plane 232a, and then cancels out the pulling force provided by the swing element 235. Accordingly, the sliding member 232 stops moving and the height position of the lifting element 234 is restricted.

When the portable electronic device 13' has a larger size in shape, the ascending distance of the lifting element 234 is shorter and the lower abutting portion 2341a abuts a location nearer to the bottom of the inclined plane 232a, as shown in FIG. 6A. Thus, the movement distance of the sliding member 232 is shorter. When the portable electronic device 13 has smaller size in shape, the ascending distance of the lifting element 234 is longer, and the lower abutting portion 2341a abuts the location nearer to the top of the inclined plane 232a, as shown in FIG. 6B. The movement distance of the sliding member 232 is thus longer.

In the embodiments of the present invention, the height position of the lifting element is adjustable by using the inclined plane in the supporting structure. Additionally, the elastic member and the damper are used in the supporting structure to slow down the velocity of the sliding member. That is, after a distance between the portable electronic device and the housing is fixed, the lifting element moves to a suitable height position and is fixed to support the portable electronic device. Accordingly, the docking station, on which the supporting structure is implemented in accordance with an embodiment of the present invention, is adapted for different portable electronic devices having different sizes or thicknesses.

The descriptions illustrated supra set forth simply the preferred embodiments of the present invention; however, the characteristics of the present invention are by no means restricted thereto. All changes, alterations, or modifications conveniently considered by those skilled in the art are deemed to be encompassed within the scope of the present invention delineated by the following claims.

What is claimed is:
1. A supporting structure adapted to be arranged on a housing, comprising:
   an elastic member;
   a sliding member having an inclined plane and connected to the elastic member, when the elastic member receives a force, the elastic element forces the sliding member to move along a first axis line;

a swing element having a first end portion and a second end portion opposite thereto, wherein when the first end portion rotates relative to a pivot point, the swing element drives the sliding member to move along the first axis line;

a lifting element arranged over a travel path of the inclined plane and having an abutting portion, wherein when the sliding member moves, the inclined plane faces toward the lifting element, and when the lifting element receives another force so that the abutting portion abuts against the inclined plane, the sliding member stops moving and the lifting element is fixed at a height position;

a damper mated with the sliding member to slow down a velocity of the sliding member; and a return element having one end connected to the housing and the other end connected to the swing element;

when the swing element moves back to an initial position through the return element, the swing element drives the sliding member to return to an original position.

2. The supporting structure according to claim 1, wherein the swing element is a lever and the pivot point is located at the second end portion.

3. The supporting structure according to claim 1, wherein the swing element is a lever and the pivot point is located between the first end portion and the second end portion.

4. The supporting structure according to claim 1, wherein the first end portion is connected to the elastic member, when the first end portion rotates relative to the pivot point, the swing element pulls the elastic member to drive the sliding member to move.

5. The supporting structure according to claim 1, further comprising a driven part abutting the first end portion and elastically connected to the sliding member through the elastic member, when the first end portion rotates relative to the pivot point, the swing element pushes the driven part and drives the sliding member to move.

6. The supporting structure according to claim 1, wherein the inclined plane is a stair-shaped surface and the abutting portion has a stair structure for mating with the inclined plane.

7. The supporting structure according to claim 1, wherein the lifting element comprises:

an ejector block having the abutting portion, wherein the abutting portion abuts the inclined plane; and a rod having one end pivotally connected to the housing and the other end connected to the ejector block, when the sliding member moves with the inclined plane facing to the ejector block, the ejector block is lifted along the inclined plane.

8. A docking station, comprising:

a housing;

a floating cover movably disposed on the housing and partially covers a surface of the housing, wherein the floating cover has a bottom surface;

at least one trigger disposed on the bottom surface; and at least one supporting structure disposed on the housing, wherein the at least one supporting structure comprises:

an elastic member;

a sliding member having an inclined plane and connected to the elastic member, when the at least one trigger activates the supporting structure, the elastic member receives a force and forces the sliding member to move along a first axis line;

a lifting element arranged over a travel path of the inclined plane and having an abutting portion, when the sliding member moves, the inclined plane faces toward the lifting element, and when the lifting element receives another force so that the abutting portion abuts against the inclined plane, the sliding member stops moving and a height position of the lifting element is fixed; and a damper mated with the sliding member to slow down a velocity of the sliding member.

9. The docking station according to claim 8, wherein the supporting structure further comprises a return element having one end connected to the housing and the other end connected to the sliding member so as to force the sliding member back to an original position.

10. The docking station according to claim 8, wherein the supporting structure further comprises a swing element having a first end portion and a second end portion opposite thereto, and when the at least one trigger pulls the swing element, the first end portion rotates relative to a pivot point and the swing element drives the sliding member to move along the first axis line.

11. The docking station according to claim 10, wherein the swing element is a lever and the pivot point is located at the second end portion.

12. The docking station according to claim 10, wherein the swing element is a lever and the pivot point is located between the first end portion and the second end portion.

13. The docking station according to claim 10, wherein the first end portion is connected to the elastic member, when the first end portion rotates relative to the pivot point, the swing element pulls the elastic member to drive the sliding member to move.

14. The docking station according to claim 10, wherein the supporting structure further comprises a driven part abutting the first end portion and elastically connected to the sliding member through the elastic member, when the first end portion rotates relative to the pivot point, the swing element pushes the driven part and drives the sliding member to move.

15. The docking station according to claim 8, wherein the inclined plane is a stair-shaped surface and the abutting portion has a stair structure for mating with the inclined plane.

16. The docking station according to claim 8, wherein the lifting element further comprises:

an abutting member having the abutting portion; and an elastic component, wherein one end of the elastic component is connected to the housing, and the other end is connected to the abutting member so that the abutting member is capable of moving along a second axis line, wherein the second axis line is not parallel to the first axis line.

17. The docking station according to claim 8, wherein the lifting element further comprises:

an ejector block having the abutting portion, wherein the abutting portion abuts the inclined plane; and a rod having one end pivotally connected to the housing and the other end connected to the ejector block, when the sliding member moves with the inclined plane facing to the ejector block, the rod rotates relative to the housing so that the ejector block is lifted along the inclined plane.

18. A supporting structure adapted to be arranged on a housing, comprising:

an elastic member;

a sliding member having an inclined plane and connected to the elastic member, when the elastic member receives a force, the elastic element forces the sliding member to move along a first axis line;

a lifting element arranged over a travel path of the inclined plane, wherein the lifting element includes an abutting member having an abutting portion and an elastic component, the elastic component has one end connected to the housing and the other end connected to the abutting member so that the abutting member is capable of moving along a second axis line, and the second axis line is not parallel to the first axis line, when the sliding member moves, the inclined plane faces toward the lifting element, and when the lifting element receives another force so that the abutting portion abuts against the inclined plane, the sliding member stops moving and the abutting member is fixed at a height position; and a damper mated with the sliding member to slow down a velocity of the sliding member.

* * * * *